United States Patent [19]

Komatsu et al.

[11] Patent Number: 4,871,796
[45] Date of Patent: Oct. 3, 1989

[54] METHOD OF PRODUCTION OF THERMOPLASTIC ELASTOMER COMPOUNDS

[76] Inventors: Masato Komatsu, Ooaza Kasanui 200-2, Hanno City, Saitama Prefecture; Isao Baba, Nishitsurugaoka 1-4-6, Ooi-machi, Iruma-gun, Saitama, Prefecture; Noboru Yamamoto, Hayamiya 1-52-13 #101, Nerima-ku, Tokyo, all of Japan

[21] Appl. No.: 154,342
[22] PCT Filed: Mar. 19, 1987
[86] PCT No.: PCT/US87/00448
  § 371 Date: Nov. 2, 1987
  § 102(e) Date: Nov. 2, 1987
[87] PCT Pub. No.: WO87/05310
  PCT Pub. Date: Sep. 11, 1987

[30] Foreign Application Priority Data

Mar. 3, 1986 [JP] Japan .................................. 61-44025

[51] Int. Cl.$^4$ .......................... C08K 3/16; C08K 5/01; C08K 5/14; C08L 9/06
[52] U.S. Cl. .................................... 524/474; 524/518; 524/519; 524/505; 524/525; 525/89; 525/95; 525/193; 525/211
[58] Field of Search ............... 524/474, 525, 505, 518, 524/519; 525/193, 89, 95, 211

[56] References Cited

U.S. PATENT DOCUMENTS

| | | | |
|---|---|---|---|
| 4,212,787 | 7/1980 | Matsuda et al. | 524/525 |
| 4,220,579 | 9/1980 | Rinehart | 524/525 |
| 4,481,323 | 11/1984 | Sterling | 524/575 |
| 4,593,062 | 6/1986 | Puydak et al. | 525/193 |
| 4,607,074 | 8/1986 | Hazelton et al. | 524/525 |

FOREIGN PATENT DOCUMENTS 6236 1/1984 Japan .
05310 9/1987 World Int. Prop. O. .

OTHER PUBLICATIONS

Derwent Abs. 80-49015c/28, Mitsui Petro (J55071739) 5-80.

Primary Examiner—Herbert J. Lilling

[57] ABSTRACT

A method of producing compounds in which the rubber phase contains a polyolefin and a halobutyl rubber, which is partially crosslinked, to which composition is then added additional polyolefin and a vulcanizable olefinic rubber, which is then further crosslinked using organic peroxides, and then blended with a styrenic rubber. The TPE compounds incorporate (A) polypropylene 10–90 weight parts (wt. pts.), (B) halobutyl rubber 90–10 wt. pts. (where $(A)+(B)=100$), (C) an olefinic rubber 10–120 wt. pts., (D) mineral oil softener 5–120 wt. pts., which are then treated thermally in the presence of (E) MOx and/or MCl, to which composition of 100 weight parts is added (F) polyolefin 100–600 wt. pts., and (G) a vulcanizable olefinic rubber 50–500 wt. pts. The resulting blend is then thermally treated with (H) organic peroxide(s), to which blend of 100 wt. pts. is then added and uniformly dispersed (I) 5–150 wt. pts. of styrenic rubber.

The method produces thermoplastic elastomer compositions which can be molded into large parts with smooth surfaces that accept paint well, have a good balance of flexibility and strength.

1 Claim, No Drawings

METHOD OF PRODUCTION OF THERMOPLASTIC ELASTOMER COMPOUNDS

BACKGROUND OF THE INVENTION

Compounds consisting of polyolefin and a partially crosslinked rubber phase possess good properties as thermoplastic elastomers (TPEs) such as heat resistance, mechanical strength, flexibility and elasticity etc., but their flowability is poorer than generally used thermoplastics, leading to problems such as flow marks in the manufacture of large molded parts. In order to resolve these problems, for example, partially crosslinked compounds of polyolefin and two rubber components (Japanese Pat. No. 54-23702), partially crosslinked compounds in which polyolefin is blended with a composition of a polyolefin and a rubber component which was treated in the presence of organic peroxide (Japanese Pat. No. 56-15743) as well a the method of manufacture of such compounds (No. 56-15740) have been proposed.

These inventors have developed compounds in which a polyolefin is added to a composition consisting of halobutyl-containing rubber phase which is partially crosslinked with a polyolefin, using metal oxide (MOx) and/or metal chlorides (MCl) as vulcanizing agents. In addition, the method of manufacture of TPE compositions including styrenic rubber has been proposed, for example Japanese Patent Appl. No. 59-6236 proposes manufacture of compositions containing a hydrogenated styrene-conjugated diene block copolymer, softening agents, olefinic resins, peroxide-curable olefinic rubber, an uncrosslinked hydrocarbon rubber and inorganic fillers, in which the peroxide-curable rubber is partially crosslinked.

Although the above-mentioned compositions possess good properties as thermoplastic elastomers (TPEs), in comparison to polyurethane (PU) type elastomers they suffer from inadequate high temperature physical properties and inadequate gloss for a high quality appearance. The present invention prevents the decrease in stiffness with increased temperature and improves the gloss of molded parts for a high quality appearance, without loss in the properties of olefinic TPEs.

SUMMARY OF THE INVENTION

A method of producing compounds in which the rubber phase contains a polyolefin and a halobutyl rubber, which is partially crosslinked, to which composition is then added additional polyolefin and a vulcanizable olefinic rubber, which is then further crosslinked using organic peroxides, and then blended with a styrenic rubber. The TPE compounds incorporate (A) polypropylene 10–90 weight parts (wt. pts.), (B) halobutyl rubber 90–10 wt. pts. (where $(A)+(B)=100$), (C) an olefinic rubber 10–120 wt. pts., (D) mineral oil softener 5–120 wt. pts., which are then treated thermally in the presence of (E) MOx and/or MCl, to which composition of 100 weight parts is added (F) polyolefin 100–600 wt. pts., and (G) a vulcanizable olefinic rubber 50–500 wt. pts. The resulting blend is then thermally treated with (H) organic peroxide(s), to which blend of 100 wt. pts. is then added and uniformly dispersed (I) 5–150 wt. pts. of styrenic rubber.

DETAILED DESCRIPTION (A) Polypropylene (PP)

PP suitable for use in this invention includes homopolymer or copolymer with ethylene, 1-butene, 1-pentene, 1-hexene or 4-methylpentene or other alpha-olefins with propylene as the main component, including random or block copolymers. Melt flow rate (MFR) is about 0.3–60 g/10 min, preferably 1–40, most preferably 3–30. Component A of the composition has the highest melting point of polyolefins, and imparts heat resistance and improved mechanical properties to the compound.

(B) Halobutyl Rubber

For purposes of this invention halobutyl rubber means halogenated butyl rubber. The halogen can be chlorine or bromine, usual content is 0.5–4.0 wt %. It is preferable that this component has a Mooney Viscosity, ML1+8 (100° C.) of about 30–100 and 0.5–4.0 mol % unsaturation. Halobutyl rubber can be crosslinked using MOx and/or MCl, and exists as a dispersed crosslinked rubber phase, imparting abrasion resistance, impermeability and "anti-slip properties" to the compound.

(C) Olefinic Rubber

Rubber in which two to more of: ethylene, propylene, butene, 1-hexene, 4-methyl-1-pentene, etc. are copolymerized (e.g., ethylene propylene rubber, EPR) or rubber in which two of the above monomers (preferably ethylene and propylene) are polymerized with dicyclopentadiene, 1,4-hexadiene, cyclooctadiene, methylene-norbornene or ethylideneorbornene (ENB) or conjugated dienes such as butadiene or isoprene. The preferred olefinic rubber has Mooney Viscosity, ML1+8 (127°), of 5–300, Iodine Value up to 30, and 35–85 wt % ethylene content. Such olefinic rubber may be polyisobutylene, butyl rubber, etc.

The olefinic rubber is present in the compound as a non-crosslinked rubber, and imparts flexibility, flowability and also acts as a binder at the interface of (A) and (B), improving tensile strength and elongation.

(D) Mineral Oil Softener

Suitable materials include hydrocarbon petroleum fraction which lessens the hardness of vulcanized rubber. Included are paraffinic, naphthenic, and aromatic types. Among these, aromatic oils have a detrimental effect on paintability, and are unsuitable for use in materials which will be painted.

(E) Vulcanizing Agents

Metal oxides (MOx) including zinc oxide, magnesium oxide, lead oxide, calcium, oxide, etc., but zinc oxide is preferred. Among metal chlorides (MCl) are zinc chloride and stannic chloride. It is also desirable to use magnesium oxide as an accelerator, to avoid corrosion of molds due to generation of free halogen. The amount o f vulcanizing agents relative to 100 parts of $(A)+(B)+(C)+(D)$ should be about 0.2–10 parts, preferable 1 to 5 parts.

(F) Polyolefin

Polyolefin useful in this invention include homo- or copolymers of two or more of ethylene, propylene, 1-butene, 1-pentene, 1-hexane, 4-methyl-1-pentene, or copolymers of vinyl esters, unsaturated carboxylic acids or their derivatives with any of the above. Random or block copolymers are encompassed. Melt flow rate, MFR (at 190° C., but 230° C. for propylene-based polymers) should be in the range of about 0.1–20 g/10 min. for ethylene-based and about 15–60 g/10 min. for propylene-based polymers. Also, two or more of the above polyolefins may be combined. Preferred among the above are low density polyethylene (LDPE), linear low density polyethylene (LLDPE), medium-density polyethylene (PE) or high density polyethylene (HDPE), polypropylene (PP), or random or block copolymers with propylene as the major component. The presence of polyolefin improves the flowability or paintability of the compounds of the present invention without detriment to rubber elasticity. Since (F) and (A) have a similar function, these components can be added in various ratios. However, the beneficial effect of (F) is particularly observed when it is used with the previously dynamically vulcanized blend of (A)–(D) (in other words heat treated with mixing in the presence of vulcanizing agents).

(G) Vulcanizable Olefinic Rubber

Useful materials include olefinic rubber which can be crosslinked through mixing and heating to decrease or eliminate flow of the rubber. For examples, ethylene propylene (EP) copolymer rubber (EPR), ethylene-butadiene copolymer rubber, ethylene-nonconjugated diene copolymer rubber, etc. are included. Among these, EPR and EP-ENB (ethylidene norbornene) rubber are preferred. The vulcanizable rubber should have a Mooney Viscosity of ML1+8 (127° C.) of about 5–300 and an iodine value of less than 30. In the final composition, the vulcanizable olefinic rubber is present as a partially crosslinked rubber phase, improving stiffness at elevated temperature.

(H) Organic Peroxides

The organic preoxides useful for crosslinking of the olefinic rubber are those with a half-life decomposition temperature of 160°–220° C.; for example di-t-butyl peroxide, dicumyl peroxide, benzoylperoxide, 2,5-dimethyl-2,5-di-(t-butyl peroxy) hexane-3, 2,5-dimethyl-2,5-di(t-butyl peroxy) hexane. In addition, for the treatment with peroxide, it is desirable to use an accelerator such as p,p'-dibenzoylquinone dioxime. The organic peroxide is used to partially crosslink the composition of the vulcanizate treated with (E) together with the polyolefin and the vulcanizable olefinic rubber, giving improved high temperature stiffness. The accelerator is included for the purpose of carrying out the partial crosslinking reaction smoothly and uniformly.

(I) Styrenic Rubber

Random or block copolymer of styrene with butadiene, isoprene, etc. Examples include styrene butadiene rubber (SBR), styrene butadiene styrene (SBS), styrene isoprene styrene (SIS), hydrogenated SBS (SEBS), and hydrogenated SIS. The styrenic rubber desirably has a Mooney Viscosity, ML1+4 (100° C.) of about 10 to 200, and styrene content of about 5–70 wt %.

Styrenic rubber improves the gloss of the final compound without detriment to the properties of olefinic TPEs. This effect of (G) is particularly observed when added following the partially dynamically vulcanized blend of (A)–(D).

The effect of the styrenic rubber is observed when it is added to the partially vulcanized blend of (A)–(H), following preparation of the blend composition (A)–(H), and not in other combinations of these components.

(J) Other (Optional) Components

As necessary for the particular end use, other optional components can be added to the composition including ethylene propylene rubber, polybutadiene-type rubbers, ethylene propylene diene monomer (EPDM) rubber or oilresistance enhancing nitrile rubbers or other synthetic or natural rubbers. Also, modified polyolefins reacted with unsaturated carboxylic acids or their derivatives, e.g., maleic anhydride, endo-bicyclo-(2,2,1)-5-heptene-2,5-dicarboxylic anhydride may be incorporated. Other components such as antioxidants, UV absorbers, metal aging retardants, antistatic agents, lubricating agents, electrical property improvers, process aids, flame-retardants or coloring agents and inorganic fillers such as talc, barium sulfate, mica, and calcium silicate fillers may be added as required. These may be added at any stage of the manufacturing process.

Ratios of Components

Ingredients are expressed on the basis of weight parts. The ratios of (A), (B), (C), (D), (E) are:
(A) 10–90 pts., preferably 20–70 pts.;
(B) 10–90 pts., preferably 30–80 pts.; with $(A)+(B)=100$;
(C) 10–120 pts., preferably 10–100 pts.,
(D) 5–120 pts., preferably 5–100 pts. Also, the incorporation of (D) in the Second Stage (to be defined below) is desirably 1–60 pts.
(E) (The crosslinking agent) should be used at 0.2–10 pts., preferably 1–5 pts., relative to 100 pts. of (A)–(D).

When (A) is less than 10 pts., the compounds lose mechanical strength and heat resistance is poor. When (A) is greater than 90 pts., hardness and compression set are high and elastomeric properties are lost.

When (C) is less than 10 pts., flexibility is low and flowability is poor, In addition, the compatabilization of (A) and (B) becomes poor. On the other hand, when (C) is greater than 120 pts., mechanical strength decreases and compression set increases.

When (D) is less than 5 pts., flexibility is inadequate and when (D) is greater than 120 pts., paintability becomes poor, mechanical strength decreases and the compounds become sticky.

The amounts of components (F) and (G) to be used with 100 pts. of the vulcanizate crosslinked with (E) are: (F) 100–600 pts., preferably 200–500, and (G) 50–500 pts., preferably 60–400 pts. The amount of (H) (organic peroxide) relative to 100 pts. of the partial vulcanizate (A-E)+(F)+(G) is: 0.005–1 pt., preferably 0.01–0.3 pts. The accelerator should be used at a level of 0.005–1 pt., preferably 0.01–0.4 pts. When (F) is less than 100, flowability and paintability are inadequate, while if (F) is greater than 600 pts., the flexibility and rubbery properties of the composition are lost. When (G) is less than 50 pts., flexibility and molding flowability are low, and in addition compatibilization with the partial vulcanizate from (E) is poor. On the other hand, when (G) is greater than 500 pts., mechanical properties decrease and compression set becomes large. When the amount of (H) is less than the above-mentioned lower bound, the crosslinking of the vulcanizable rubber is inadequate and good high temperature stiffness is not obtained. When (H) exceeds the high end of the range, the flowability of the compound decrease as the degree of crosslinking increases. It is not desirable for the accelerator to exceed the mentioned range because the crosslinking reaction proceeds too far, resulting in low flowability, and in addition unreacted agent remains in the compound, changing its physical properties.

The amount of (I), relative to 100 pts. of the vulcanizate from (H), should be 3–200 pts. preferably 5–150 pts. When (I) is less than 3 pts., the gloss of the composition is not improved, while for (I) greater than 200 pts. the physical properties become poorer. It is desirable that other optional components be in the range 0.30 wt. %.

Method of Manufacturing the Composition

First, (A), (B), (C), (D), and vulcanizing agent (E) (MOx and/or MCl), and other components as necessary, are mixed and thermally treated, i.e. blended in the melt. The blending should be done at a temperature at which all components melt/flow, usually 160°–250° C. and desirably 170°–220° C. for 1–10 min., desirably 3–5 min. In this way, a composition in which the dispersed component (B) only is selectively crosslinked is obtained.

The melt blending may be carried out in equipment such as pressure kneaders, Banbury Mixers, screw-type extruders, etc. (This operation is referred to as the First Stage.)

Next, (F), (G) and (H) (organic peroxide plus accelerator) are added to the blend and melt blending is carried out. For example, pellets of the above components can be premixed in a Henschel mixer, ribbon blender, etc., then melt blended in an extruder, Banbury or kneader, etc. At this time, various stabilizers, coloring agents, inorganic fillers, softening agents, etc. can be added as required. (This is referred to as the Second Stage.)

Finally, to the above blend is added uniformly component (I). To achieve uniform mixing, these can be premixed in a Henschel mixer or ribbon blender, etc., followed by melt blending in an extruder, Banbury or kneader, etc. At this time, other materials such as synthetic rubbers, modified polyolefins, various stabilizers, coloring agents and inorganic fillers can be added. (This is referred to as the Third Stage.)

In the composition produced by the method of this invention, (B) is partially crosslinked, so compatibility is excellent, and without loss of rubbery properties, the mechanical strength is high, and impact strength, especially at low temperature, is improved. In addition, due to the successive vulcanization with components (F) and (G), and the uniform incorporation of (I), heat resistance, paintability adhesion, flowability and gloss are improved. Thus, there are no flow marks in large molded parts, and products have good high quality gloss. The composition of the present invention can be processed easily using conventional techniques for TPEs, such as blow molding extrusion or injection molding, etc. The compositions of the present invention have a good balance of flexibility, strength and heat resistance, and are especially useful as materials for automotive parts, e.g., rack and pinion boots, hoses, side-moldings, spoilers and bumpers.

EXAMPLES

Test Methods (1) MFR: JIS K7210 (wt. 2.16 kg, 230° C.).
(2) MI: JIS K7210 (wt. 2.16 kg, 190° C.).
(3) Tensile strength and elongation at break: JIS K7113.
(4) Bending modulus: JIS K7203.
(5) Izod impact: JIS K7110.
(6) Gloss: JIS K7105, measured on 60° plane.
(7) Heat deflection temperature: JIS K7207.
(8) Processability:
  (a) Conditions
    Inj. molder: Mitsubishi Natco 350 MV XL40
    Inj. Molding temperature: 230° C.
    Inj. molding pressure: primary 800 kg/cm$^2$
    Inj. molding pressure: secondary 500 kg/cm$^2$
    Inj. time: 13 seconds
    Cycle: 38 seconds
    Gate: ride gate
    Part: 3×100×350 mm flat plat
  (b) Judgement
    Flow-marks O: none
    Flow-marks D: very little
    Flow-marks X: many, severe
(9) Paintability:
  (a) Primer method
    After test piece was cleaned in trichloroethylene (TCE) vapor for one minute, primer ("Plagloss," Nippon Yushi Co.) was painted and treated at 120° C. for 30 minutes. Then, over this layer was painted upper coating ("Flexene 101," Nippon Paint Co.), and treated at 120° C. for 30 minutes.
  (b) Plasma method
    After test piece was cleaned in TCE vapor for one minute, it was plasma treated (O$_2$ plasma, 1.0 KW×1.0 torr×60 seconds) and painted with an upper coating ("Flexene 101," Nippon Paint Co.), and treated at 120° C. for 30 minutes.
  (c) Evaluation
    Initial adhesion: according to JIS K5400 test, "tile".
    Resistance to warm water: Appearance and "tile" test after immersion in 40° C. water for 240 hrs.
(10) Gel Fraction: One g. of sample was placed in a 100 mesh gold screen and boiled in hot xylene for 12 hours. Then, gel fraction was determined as the remaining xylene insolubles after vacuum drying for 24 hours.

Examples 1–16, and comparative examples (comp. ex.) 1, 2, 3.

Materials used (A) Propylene-ethylene block copolymer (MFR =15.0 g/10 min., ethylene 7 wt %), referred to as "PP-Block-1."
(B) Chlorobutyl rubber (ML 1+8 (100)=50, chlorine content 1%, 2 mol % unsat.), referred to as "CIIR."
(C) ENB-EPDM (ML 1+8 (127)=35. Iodine Valve=4.0, ethylene=65 wt %), referred to as "EPDM-1."
(D) Naphthenic process oil (viscosity—specific gravity coefficient=0.880), referred to as "softener."
(E) ZnO, MgO (halogen accelerator).
(F) Propylene-ethylene block copolymer, (MFR=40 g/10 min., ethylene content=7%), referred to as "PP-Block-2").
(G) ENB-EPDM (ML 1+8 (127° C.)=45, Iodine Valve=3, referred to as "EPDM-2"), EPR (ML 1+4 (100° C.)=24, ethylene content=73%, referred to as "EPR").
(H) Organic peroxide (Nippon Yushi Co., "Perhexyne 2,5B"), P,P'-dibenzoylquinone dioxime (accelerator).
(I) SEBS block copolymer - Shell Chemical Co., Kraton G1657, solution viscosity at 25° C.=1100 cp, 20 wt % toluene solution, referred to as "SEBS"; SBR - JSR 1778N, ML1+4 (100)=46, referred to as "SBR."
Other: Talc (silane treated, avg. dia. 2.5 microns), EPDM rubber, (ML 1+8 (127)=45, iodine value=3, ethylene=65 wt %), referred to as "EPDM-2"; EPR (ML 1+4 (100)=24, ethylene 73 wt %), referred to as "EPR", MA - modified propylene-ethylene block copolymer (MA content 0.5 wt %), referred to as "CMPP"; acrylonitrile-butadiene rubber (ML 1+4 (100)=56, AN content=35%), referred to as "NBR".

Preparation of the Composition
(A)–(D) and talc were combined in the proportions shown in Table 1, and to 100 pts. of the resulting composition 2 pts. zinc oxide (ZnO) and 0.5 pt. magnesium oxide (MgO) were added and melt blended in a Banbury Mixer at 170° C. for 3 minutes. The resulting composition was sheeted, cut, and pelletized (Stage 1).

Next, to the pellets obtained in Stage 1 were added components (F) and (G) in the proportions shown in Table 1, to 100 pts. of this mixture were added 0.3 pts. of organic peroxide and 0.36 pts. of accelerator. After premixing in a Henschel mixer, this was extruded in a twin-screw extruder at 200° C. (Stage 2).

Finally, to the pellets obtained in Stage 2 were added (I), EPR and CMPP as shown in Table 1, and after premixing in a Henschel mixer this was fed to a twin-screw extruder and extruded at 200° C. to obtain the final composition (Stage 3).

The characteristics of the resulting compounds are shown in Table 1. In addition, in examples 1-5 the gel contents were measured and the results, given in Table 1, indicate that partial crosslinking took place. For comparison, Comparative Example 1 shows a case in which no styrenic rubber was added in Stage 3, and Comparative Example 2 shows a case in which SEBS was added in place of EPR in Stage 2. Comparative Example 3 shows a case where vulcanization was not carried out in Stage 2. Resulting properties are shown in Table 1.

TABLE 1

| | Ex. | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Stage 1 | | | | | | | | | | | |
| PP-Block-1 (pts.) | 50 | 50 | 50 | 50 | 50 | 50 | 50 | 50 | 50 | 50 | 50 |
| CIIR (pts.) | 50 | 50 | 50 | 50 | 50 | 50 | 50 | 50 | 50 | 50 | 50 |
| EPDM-1 (pts.) | 100 | 100 | 100 | 100 | 100 | 100 | 100 | 100 | 100 | 100 | 100 |
| Softener (pts.) | 94 | 94 | 94 | 94 | 94 | 94 | 94 | 94 | 94 | 94 | 94 |
| Talc (pts.) | 19 | 19 | 19 | 19 | 19 | 19 | 19 | 19 | 19 | 19 | 19 |
| Stage 2 | | | | | | | | | | | |
| PP-Block-2 (pts.) | 700 EPR 400 | 700 EPR 400 | 700 EPR 400 | 700 EPR 400 | 700 EPR 400 | 700 EPR 400 | 700 EPDM 400 | 700 EPDM 400 | 700 EPR 400 | 700 EPR 400 | 700 EPR 400 |
| Stage 3 (pts.) | SEBS 75 | SEBS 160 | SEBS 350 | SEBS 610 | Softening Agent SEBS 2,120 | SEBS 610 | SEBS 160 | SEBS 610 | SEBS 610 | SEBS 610 | SEBS 350 EPR 160 |
| Other Components | — | — | — | — | — | — | — | — | — | CMPP 5 | — |
| Fundamental Properties | | | | | | | | | | | |
| MFR (g/10 min.) | — | 9 | 12 | 15 | 18 | 17 | 8 | 13 | 11 | 12 | 13 |
| Flex. Mod. @ 23° C. (kg/cm²) | 2,800 | 2,900 | 2,900 | 2,900 | 2,900 | 2,900 | 3,000 | 3,000 | 3,300 | 3,300 | 3,100 |
| Flex. Mod. @ 80° C. (kg/cm²) | 1,130 | 1,120 | 1,120 | 1,100 | 1,080 | 1,100 | 1,100 | 1,100 | 1,120 | 1,130 | 1,100 |
| Tens. @ Break (kg/cm²) | 130 | 125 | 110 | 110 | 110 | 108 | 130 | 125 | 125 | 130 | 120 |
| Elong. @ Break (%) | 300 | 300+ | 300+ | 300+ | 300+ | 300+ | 300+ | 300+ | 300+ | 300+ | 300+ |
| Room Temp. IZOD | NB | NB | NB | NB | NB | NB | NB | NB | NB | NB | NB |
| (kg-cm/cm) @ −40° C. | 58 | 69 | 75 | 77 | 80 | 80 | 72 | 78 | 45 | 73 | 70 |
| Heat Distort. Temp. (°C.) | 60 | 58 | 55 | 52 | 51 | 50 | 59 | 56 | 59 | 62 | 52 |
| Processability | | | | | | | | | | | |
| Flow Marks | 0 | 0 | 0 | 0 | 0 | 0 | 0 | 0 | 0 | 0 | 0 |
| Gloss (%) | 45 | 58 | 62 | 75 | 82 | 77 | 73 | 75 | 80 | 80 | 65 |
| Paintability | | | | | | | | | | | |
| Primer Method | 100/100 | 100/100 | 100/100 | 100/100 | 100/100 | 100/100 | 100/100 | 100/100 | 100/100 | 100/100 | 100/100 |
| Plasma Method | 100/100 | 100/100 | 100/100 | 100/100 | 100/100 | 100/100 | 100/100 | 100/100 | 100/100 | 100/100 | 100/100 |
| Gel Fraction (%) | 57 | 54 | 47 | 47 | 24 | — | — | — | — | — | — |

| | Ex. 12 | Ex. 13 | Ex. 14 | Ex. 15 | Ex. 16 | Comparative Examples 1 | 2 | 3 |
|---|---|---|---|---|---|---|---|---|
| Stage 1 | | | | | | | | |
| PP-Block-1 (pts.) | 50 | 50 | 60 | 40 | 60 | 50 | 50 | 50 |
| CIIR (pts.) | 50 | 50 | 40 | 60 | 40 | 50 | 50 | 50 |
| EPDM-1 (pts.) | 100 | 100 | 110 | 100 | 110 | 100 | 100 | 100 |
| Softener (pts.) | 94 | 94 | 94 | 94 | 94 | 94 | 94 | 94 |
| Talc (pts.) | 19 | 19 | 19 | 19 | 19 | 19 | 19 | 19 |
| Stage 2 | | | | | | | | |
| PP-Block-2 (pts.) | 700 EPR 400 | 700 EPR 400 | 700 EPR 400 | 700 EPR 400 | 700 EPDM-2 400 | 700 EPR 400 | 700 | 700 EPR 400 |
| Stage 3 | SEBS | SEBS | SEBS | SEBS | SEBS | — | SEBS 350 | — |

TABLE 1-continued

| | | | | | | | | |
|---|---|---|---|---|---|---|---|---|
| Other Components | 350 NBR 160 | 610 CMPP 2 | 610 — | 610 — | 610 — | — — | — — | — — |
| Fundamental Properties | | | | | | | | |
| MFR (g/10 min.) | 12 | 15 | 17 | 13 | 15 | 5 | 3 | 0.1 |
| Flex. Mod. @ 23° C. (kg/cm$^2$) | 3,100 | 3,200 | 3,500 | 3,000 | 3,150 | 2,800 | 2,700 | 2,900 |
| Flex. Mod. @ 80° C. (kg/cm$^2$) | 1,100 | 1,120 | 1,200 | 1,030 | 1,200 | 1,140 | 1,150 | 820 |
| Tens. @ Break (%) | 300+ | 300+ | 300+ | 300+ | 300+ | 300+ | 300+ | 300+ |
| Room Temp. IZOD | NB | NB | NB | NB | NB | NB | NB | NB |
| (kg-cm/cm) @ −40° C. | 72 | 69 | 72 | 78 | 74 | 52 | 46 | 20 |
| Heat Distort. Temp. (°C.) | 53 | 55 | 58 | 50 | 51 | 60 | 58 | 51 |
| Processability | | | | | | | | |
| Flow Marks | 0 | 0 | 0 | 0 | 0 | 0 | 0 | X |
| Gloss (%) | 53 | 83 | 78 | 73 | 75 | 30 | 30 | 25 |
| Paintability | | | | | | | | |
| Primer Method | 100/100 | 100/100 | 100/100 | 100/100 | 100/100 | 100/100 | 100/100 | 90/100 |
| Plkasma Method | 100/100 | 100/100 | 100/100 | 100/100 | 100/100 | 100/100 | 100/100 | 95/100 |

NB = No Break.

What is claimed is:

1. A method of manufacture of thermoplastic elastomer comprising thermally blending a composition comprising (A) polypropylene 10–90 weight parts, (B) halobutyl rubber 90–10 weight parts, wherein (A)+(B)=100 weight parts, (C) olefinic rubber 10–120 weight parts, and (D) mineral oil softening agent 5–120 weight parts, in the presence of (E) metal oxides and/or metal chlorides, and blending 100 weight parts of said thermally treated composition with (F) polyolefin 100–600 weight parts, and (G) vulcanizable olefinic rubber 50–500 weight parts, and further thermally treating said blend of (A) through (G) in the presence of (H) organic peroxide, and homogeneously blending 100 weight parts of the resulting composition with (I) styrenic rubber 5–100 weight parts.

* * * * *

UNITED STATES PATENT OFFICE
CERTIFICATE OF CORRECTION

Patent No. 4,871,796          Dated   October 3, 1989

Inventor(s) Masato Komatsu, Isao Baba, Noboru Yamamoto

It is certified that error appears in the above-identified patent and that said Letters Patent is hereby corrected as shown below:

On the title page:
ASSIGNEE: Toa Nenryo Kogyo K.K., Tokyo, Japan

Signed and Sealed this

Twentieth Day of November, 1990

*Attest:*

HARRY F. MANBECK, JR.

*Attesting Officer*     *Commissioner of Patents and Trademarks*